United States Patent
Tomasek et al.

(10) Patent No.: US 12,462,822 B2
(45) Date of Patent: Nov. 4, 2025

(54) DECODER AND DECODING METHOD SELECTING AN ERROR CONCEALMENT MODE, AND ENCODER AND ENCODING METHOD

(71) Applicant: Fraunhofer-Gesellschaft zur Foerderung der angewandten Forschung e.V., Munich (DE)

(72) Inventors: Adrian Tomasek, Erlangen (DE); Ralph Sperschneider, Erlangen (DE); Jan Buethe, Erlangen (DE); Conrad Benndorf, Erlangen (DE); Martin Dietz, Erlangen (DE); Markus Schnell, Erlangen (DE); Maximilian Schlegel, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 964 days.

(21) Appl. No.: 17/402,202

(22) Filed: Aug. 13, 2021

(65) Prior Publication Data
US 2022/0014310 A1   Jan. 13, 2022

Related U.S. Application Data

(63) Continuation of application No. PCT/EP2020/053618, filed on Feb. 12, 2020.

(30) Foreign Application Priority Data

Feb. 13, 2019   (EP) ..................... 19156997
Feb. 13, 2019   (EP) ..................... 19157036
(Continued)

(51) Int. Cl.
*G10L 19/035* (2013.01)
*G10L 19/022* (2013.01)
(Continued)

(52) U.S. Cl.
CPC .......... *G10L 19/035* (2013.01); *G10L 19/022* (2013.01); *G10L 21/0324* (2013.01);
(Continued)

(58) Field of Classification Search
CPC ... G10L 21/0324; G10L 19/02; G10L 19/005; G10L 19/008; G10L 19/032; G10L 19/04;
(Continued)

(56) References Cited

U.S. PATENT DOCUMENTS

| | | | |
|---|---|---|---|
| 5,148,271 A | 9/1992 | Kato et al. | |
| 5,712,861 A | 1/1998 | Inoue et al. | |

(Continued)

FOREIGN PATENT DOCUMENTS

| | | |
|---|---|---|
| CN | 1343390 A | 4/2002 |
| CN | 1732512 A | 2/2006 |

(Continued)

OTHER PUBLICATIONS

ISO/IEC, {Uploaded in 3 parts} "Information technology Coding of audio-visual objects, Part 3: Audio", ISO/IEC 14496-3—MPEG-4 Information technology, Standard, International Organization for Standardization, Geneva, CH, 2009, 1416 pp.

(Continued)

*Primary Examiner* — Albert Decady
*Assistant Examiner* — Grace V Braden
(74) *Attorney, Agent, or Firm* — Perkins Cole LLP; Michael A. Glenn

(57) ABSTRACT

A decoder for decoding a frame to reconstruct a signal portion of a signal is provided. The signal portion is encoded within the frame, wherein the frame includes a bitstream payload and two or more redundancy bits, wherein the bitstream payload includes a plurality of payload bits, wherein each of the payload bits exhibits a position within the bitstream payload. The decoder includes a channel (Continued)

decoding module, being configured to detect, depending on the two or more redundancy bits, whether the bitstream payload includes one or more corrupted bits being one or more of the payload bits that are distorted or that are likely to be distorted. Moreover, the decoder includes a source decoding module.

34 Claims, 4 Drawing Sheets

(30) Foreign Application Priority Data

| | | |
|---|---|---|
| Feb. 13, 2019 | (EP) | 19157042 |
| Feb. 13, 2019 | (EP) | 19157047 |
| Jun. 11, 2019 | (WO) | PCT/EP2019/065172 |
| Jun. 11, 2019 | (WO) | PCT/EP2019/065205 |
| Jun. 11, 2019 | (WO) | PCT/EP2019/065209 |

(51) Int. Cl.

| | |
|---|---|
| *G10L 21/0324* | (2013.01) |
| *H03M 13/07* | (2006.01) |
| *H03M 13/09* | (2006.01) |
| *H03M 13/15* | (2006.01) |
| *H04B 17/309* | (2015.01) |
| *H04L 1/00* | (2006.01) |

(52) U.S. Cl.
CPC ............ *H03M 13/07* (2013.01); *H03M 13/09* (2013.01); *H03M 13/1515* (2013.01); *H04B 17/309* (2015.01); *H04L 1/0009* (2013.01); *H04L 1/0032* (2013.01); *H04L 1/0046* (2013.01); *H04L 1/0084* (2013.01)

(58) Field of Classification Search
CPC ...... G10L 19/20; H03M 13/09; H04L 1/0009; H04L 1/0032; H04L 1/0046; H04L 1/0084; H04L 1/0042; H04L 1/0047; H04L 1/0057; H04L 1/0083; H04L 1/08
USPC ........................................................ 714/746
See application file for complete search history.

(56) References Cited

U.S. PATENT DOCUMENTS

| | | | |
|---|---|---|---|
| 5,852,469 A | 12/1998 | Nagai et al. | |
| 5,862,518 A | 1/1999 | Nomura et al. | |
| 6,256,064 B1 | 7/2001 | Chujoh et al. | |
| 6,256,487 B1 | 7/2001 | Bruhn | |
| 6,279,133 B1 | 8/2001 | Vafai et al. | |
| 6,301,558 B1 | 10/2001 | Isozaki | |
| 6,405,338 B1 | 6/2002 | Sinha et al. | |
| 6,546,515 B1* | 4/2003 | Vary | H04L 1/0047 |
| | | | 714/746 |
| 6,975,254 B1 | 12/2005 | Sperschneider et al. | |
| 7,058,132 B1 | 6/2006 | Sebire et al. | |
| 7,266,750 B1 | 9/2007 | Patapoutian et al. | |
| 7,356,748 B2* | 4/2008 | Taleb | G06F 21/56 |
| | | | 714/746 |
| 7,596,489 B2 | 9/2009 | Kovesi et al. | |
| 8,391,373 B2 | 3/2013 | Virette et al. | |
| 8,462,702 B2 | 6/2013 | Jax et al. | |
| 8,798,172 B2 | 8/2014 | Oh et al. | |
| 9,026,434 B2 | 5/2015 | Greer et al. | |
| 9,823,745 B1 | 11/2017 | Fateh | |
| 10,762,907 B2 | 9/2020 | Tomasek et al. | |
| 10,984,804 B2 | 4/2021 | Lecomte et al. | |
| 11,875,806 B2 | 1/2024 | Buethe et al. | |
| 12,057,133 B2 | 8/2024 | Buethe et al. | |
| 2002/0026616 A1 | 2/2002 | Kikuchi et al. | |
| 2002/0030612 A1 | 3/2002 | Hetherington et al. | |
| 2002/0072901 A1 | 6/2002 | Bruhn | |
| 2002/0080725 A1 | 6/2002 | Bradley | |
| 2002/0178418 A1 | 11/2002 | Ramprashad et al. | |
| 2003/0106009 A1 | 6/2003 | Jarchi et al. | |
| 2004/0039464 A1* | 2/2004 | Virolainen | G10L 19/005 |
| 2004/0128128 A1 | 7/2004 | Wang et al. | |
| 2005/0163234 A1 | 7/2005 | Taleb | |
| 2006/0104366 A1 | 5/2006 | Huang et al. | |
| 2006/0271355 A1 | 11/2006 | Wang et al. | |
| 2007/0065425 A1 | 3/2007 | Behrens et al. | |
| 2007/0086058 A1 | 4/2007 | Ordentlich et al. | |
| 2007/0121721 A1 | 5/2007 | Kim et al. | |
| 2007/0140359 A1 | 6/2007 | Ehret et al. | |
| 2007/0258651 A1 | 11/2007 | Shin et al. | |
| 2007/0271480 A1* | 11/2007 | Oh | G10L 19/005 |
| | | | 714/3 |
| 2007/0282600 A1 | 12/2007 | Ojanpera | |
| 2008/0071530 A1 | 3/2008 | Ehara | |
| 2008/0111719 A1 | 5/2008 | Sperschneider et al. | |
| 2008/0126096 A1 | 5/2008 | Oh et al. | |
| 2008/0126904 A1 | 5/2008 | Sung et al. | |
| 2008/0133242 A1 | 6/2008 | Sung et al. | |
| 2008/0301536 A1 | 12/2008 | Shin et al. | |
| 2009/0030675 A1 | 1/2009 | Liebchen | |
| 2009/0076807 A1 | 3/2009 | Xu et al. | |
| 2009/0209636 A1 | 8/2009 | Raederstorff et al. | |
| 2009/0281797 A1 | 11/2009 | Zopf et al. | |
| 2010/0023830 A1 | 1/2010 | Wengerter et al. | |
| 2010/0040153 A1 | 2/2010 | Imanaka et al. | |
| 2010/0080305 A1 | 4/2010 | Guo et al. | |
| 2010/0115370 A1 | 5/2010 | Laaksonen et al. | |
| 2011/0026848 A1 | 2/2011 | Ordentlich et al. | |
| 2011/0075573 A1 | 3/2011 | Saigusa et al. | |
| 2011/0075753 A1 | 3/2011 | Jung et al. | |
| 2011/0138258 A1 | 6/2011 | Okamura et al. | |
| 2011/0170711 A1 | 7/2011 | Rettelbach et al. | |
| 2011/0173009 A1 | 7/2011 | Fuchs et al. | |
| 2011/0191111 A1 | 8/2011 | Chu et al. | |
| 2011/0320901 A1 | 12/2011 | Sato et al. | |
| 2012/0271644 A1 | 10/2012 | Bessette et al. | |
| 2013/0187798 A1 | 7/2013 | Marpe et al. | |
| 2013/0254615 A1 | 9/2013 | Vijayasankar et al. | |
| 2013/0332152 A1 | 12/2013 | Lecomte et al. | |
| 2014/0012589 A1 | 1/2014 | Oh et al. | |
| 2014/0063062 A1 | 3/2014 | Fateh | |
| 2014/0142957 A1 | 5/2014 | Sung et al. | |
| 2014/0310010 A1 | 10/2014 | Seo et al. | |
| 2015/0142452 A1* | 5/2015 | Sung | G10L 19/12 |
| | | | 704/500 |
| 2015/0181194 A1 | 6/2015 | Izawa et al. | |
| 2016/0171740 A1 | 6/2016 | Yerli | |
| 2016/0247506 A1 | 8/2016 | Lecomte et al. | |
| 2016/0266699 A1 | 9/2016 | Zhao et al. | |
| 2016/0285718 A1 | 9/2016 | Bruhn | |
| 2016/0322060 A1 | 11/2016 | Riedmiller et al. | |
| 2017/0004835 A1 | 1/2017 | Schnabel et al. | |
| 2017/0094295 A1 | 3/2017 | Gu | |
| 2017/0169833 A1 | 6/2017 | Lecomte et al. | |
| 2018/0026663 A1 | 1/2018 | Wu et al. | |
| 2018/0122386 A1 | 5/2018 | Sung et al. | |
| 2018/0234115 A1 | 8/2018 | Noh et al. | |
| 2018/0358023 A1 | 12/2018 | Sasaki | |
| 2019/0005965 A1 | 1/2019 | Lecomte et al. | |
| 2019/0005966 A1 | 1/2019 | Lecomte et al. | |
| 2019/0005967 A1 | 1/2019 | Lecomte et al. | |
| 2019/0051311 A1 | 2/2019 | Sung et al. | |

FOREIGN PATENT DOCUMENTS

| | | |
|---|---|---|
| CN | 101174931 A | 5/2008 |
| CN | 101218630 A | 7/2008 |
| CN | 101261833 A | 9/2008 |
| CN | 101331733 A | 12/2008 |
| CN | 101569198 A | 10/2009 |
| CN | 102034478 A | 4/2011 |
| CN | 102057424 A | 5/2011 |
| CN | 102163430 A | 8/2011 |
| CN | 102165782 A | 8/2011 |
| CN | 103597544 A | 2/2014 |

(56) References Cited

FOREIGN PATENT DOCUMENTS

| | | |
|---|---|---|
| CN | 103688306 A | 3/2014 |
| CN | 104021769 A | 9/2014 |
| CN | 104885149 A | 9/2015 |
| CN | 107077851 A | 8/2017 |
| CN | 108711431 A | 10/2018 |
| CN | 108885875 A | 11/2018 |
| CN | 109155133 A | 1/2019 |
| CN | 109313905 A | 2/2019 |
| EP | 0170328 A1 | 2/1986 |
| EP | 0732855 A2 | 9/1996 |
| EP | 0798888 A2 | 10/1997 |
| EP | 0936772 A2 | 8/1999 |
| EP | 1155498 B1 | 3/2004 |
| EP | 2270777 A2 | 1/2011 |
| EP | 3011559 B1 | 7/2017 |
| EP | 3230980 A1 | 10/2017 |
| EP | 3697005 A1 | 8/2020 |
| EP | 4239924 A2 | 9/2023 |
| GB | 2253123 A | 8/1992 |
| IN | 201637013771 A | 8/2016 |
| JP | H04219033 A | 8/1992 |
| JP | H06202696 A | 7/1994 |
| JP | H06204983 A | 7/1994 |
| JP | H09182073 A | 7/1997 |
| JP | H1022937 A | 1/1998 |
| JP | H11317675 A | 11/1999 |
| JP | 2998254 B2 | 1/2000 |
| JP | 2000123083 A | 4/2000 |
| JP | 2000227756 A | 8/2000 |
| JP | 3328093 B2 | 9/2002 |
| JP | 2003289539 A | 10/2003 |
| JP | 2005006289 A | 1/2005 |
| JP | 2006287551 A | 10/2006 |
| JP | 2009276890 A | 11/2009 |
| JP | 2009538460 A | 11/2009 |
| JP | 2010503352 A | 1/2010 |
| JP | 2010511201 A | 4/2010 |
| JP | 4841789 B2 | 10/2011 |
| JP | 2012242785 A | 12/2012 |
| JP | 5186054 B2 | 1/2013 |
| JP | 2017097326 A | 6/2017 |
| KR | 100213694 B1 | 8/1999 |
| KR | 10-2001-0108051 A | 12/2001 |
| KR | 20060094105 A | 8/2006 |
| KR | 20060101889 A | 9/2006 |
| KR | 10-2007-0110311 A | 11/2007 |
| KR | 10-2015-0099615 A | 8/2015 |
| RU | 2239950 C2 | 11/2004 |
| RU | 2408089 C9 | 4/2011 |
| RU | 2610588 C2 | 2/2017 |
| TW | 200743388 A | 11/2007 |
| TW | 201116058 A | 5/2011 |
| TW | 201248616 A | 12/2012 |
| TW | 201521016 A | 6/2015 |
| TW | 201528255 A | 7/2015 |
| TW | 201539433 A | 10/2015 |
| TW | 201724085 A | 7/2017 |
| TW | 201813322 A | 4/2018 |
| WO | 9711535 A1 | 3/1997 |
| WO | 03065755 A1 | 8/2003 |
| WO | 2005086436 A1 | 9/2005 |
| WO | 2007008007 A1 | 1/2007 |
| WO | 2007084475 A2 | 7/2007 |
| WO | 2010000303 A1 | 1/2010 |
| WO | 2010088625 A1 | 8/2010 |
| WO | 2010103607 A1 | 9/2010 |
| WO | 2011103678 A1 | 9/2011 |
| WO | 2012141486 A2 | 10/2012 |
| WO | 2012158159 A1 | 11/2012 |
| WO | 2014072260 A2 | 5/2014 |
| WO | 2016091893 A1 | 6/2016 |
| WO | 2017153006 A1 | 9/2017 |
| WO | 2017153299 A2 | 9/2017 |

OTHER PUBLICATIONS

ETSI TS 102 563 V1.1.1, Digital Audio Broadcasting (DAB) Transport of Advanced Audio Coding (AAC) audio (Feb. 2007).
"Digital Audio Broadcasting (DAB) Transport of Advanced Audio Coding (AAC) audio", ETSI TS 102 563 V1.1.1, Feb. 2007—duplicate.
Dun, Yujie, et al., "An extrapolation method for MDCT domain frame loss concealment", 2014 IEEE China Summit & International Conference on Signal and Information Processing (ChinaSIP). IEEE, 2014, pp. 650-654 (Year: 2014).
3GPP TS 26.441, "Codec for Enhanced Voice Services (EVS); General Overview", 3GPP TS 26.441 V13.0.0 (Dec. 2015), Dec. 2015, 12 pp.
Boltze, Thomas, et al., "Audio services and applications 1 of 2", International Symposium on Digital Audio Broadcasting, No. ED. 2, XP003011836, pp. 75-125.
Boltze, Thomas, et al., "Audio services and applications 2 of 2", International Symposium on Digital Audio Broadcasting, No. ED. 2, XP003011836, pp. 75-125.
ETSI Standard, "[Uploaded in 13 parts] Digital Radio Mondiale; System Specification", ETSI ES 201 980 V4.1.1 (Jan. 2014) (195 pp. ), Jan. 2014, pp. 1-14.
ETSI TR, "ETSI TR 103590 V1.1.1 (Sep. 2018), "Digital Enhanced Cordless Telecommunications (DECT)", Study of Super Wideband Codec in DECT for narrowband, wideband and super-wideband audio communication including options of low delay audio connections (lower than 10 ms framing)", Sep. 2018.
ETSI TS 102 563, "Digital Audio Broadcasting (DAB)", Transport of Advanced Audio Coding (AAC) Audio, ETSI vol. BROADCAS, No. V1.2.1, May 1, 2010, XP014046351, May 2010.
Fairhurst, G, et al., "Smart Codec: an Adaptive Packet Data Link", IEE Proceedings: Communications, Institution of Electrical Engineers, GB, (Jun. 1, 1998), XP000766291, vol. 145, No. 3, pp. 180-185.
Hoeve, H, et al., "Fehlerkorrektur im Compact Disc Digital Audio-System", NTZ Nachrichtentechnische Zeitschrift, VDE Verlag GmbH, vol. 36, No. 7, XP009521920, pp. 446-448.
Jacaba, Joebert S, "Audio Compression Using Modified Discrete Cosine Transform—The MP3 Coding Standard—1 of 2", Undergraduate research paper, XP055359704, 2001, pp. 1-83.
Jacaba, Joebert S, "Audio Compression Using Modified Discrete Cosine Transform—The MP3 Coding Standard—2 of 2", Undergraduate research paper, XP055359704, 2001, pp. 1-83.
Lauber, Pierre, et al., "Error Concealment for Compressed Digital Audio", in Audio Engineering Society, XP008075936.
Moon, Todd K, "Error Correction Coding: Mathematical Methods and Algorithms", Wiley-Interscience, 2005, 2005, 39 pp.
Perkins, Colin, et al., "A Survey of Packet Loss Recovery Techniques for Streaming Audio", IEEE vol. 12, No. 5, XP000875014, pp. 40-48.
Rämö, Anssi, et al., "EVS Channel Aware Mode Robustness to Frame Erasures", in Interspeech 2016, San Francisco, CA, USA.
Rose, Kenneth, et al., "A Frame Loss Concealment Technique for MPEG-AAC", AES Convention 120, XP040507556.
Rose, Kenneth, et al., "Frame Loss Concealment for Audio Decoders Employing Spectral Band Replication", AEL Convention 121, XP040507885.
Sperschneider, Ralph , et al., "Error Resilient Source Coding with Differential Variable Length Codes and its Application to MPEG Advance Audio Coding", Audio Engineering Societey, Munich, 2002, 19 pp.
Taleb, Anisse, et al., "Partial Spectral Loss Concealment in Transform Coders", IEEE Conference on Acoustics, Speech, and Signal Processing, vol. 3, XP010792360, pp. 185-188.
Venkatraman, A, et al., "Improved Error Resilience for VOLTE and VoIP with 3GPP EVS Channel Aware Coding", in ICASSP.
Kamamoto, Yutaka, et al., "Trend of High sound quality audio coding technology for VOLTE", Journal of the Acoustic Society of Japan, vol. 74, No. 2, with English translation, pp. 83-92.
ETSI TS 102 563 digital audio broadcasting DAB: transport of advanced audio coding (AAC) audio Technical Specification; May 2010.

(56) References Cited

OTHER PUBLICATIONS

ETSI TS 102 563 V1.1.1, Digital Audio Broadcasting (DAB) Transport of Advanced Audio Coding (AAC) audio (Feb. 2007) (26 pages).

* cited by examiner

DECODER AND DECODING METHOD SELECTING AN ERROR CONCEALMENT MODE, AND ENCODER AND ENCODING METHOD

CROSS-REFERENCE TO RELATED APPLICATIONS

This application is a continuation of copending International Application No. PCT/EP2020/053618, filed Feb. 12, 2020, which is incorporated herein by reference in its entirety, and additionally claims priority from European Applications Nos. EP 19157042.3, filed Feb. 13, 2019, EP 19156997.9, filed Feb. 13, 2019, EP 19157036.5, filed Feb. 13, 2019, and EP 19157047.2, filed Feb. 13, 2019, and International Applications Nos. PCT/EP2019/065209, filed Jun. 11, 2016, PCT/EP2019/065205, filed Jun. 11, 2016, and PCT/EP2019/065172, filed Jun. 11, 2016, which are all incorporated herein by reference in their entirety.

The present invention relates to a decoder and a decoding method selecting an error concealment mode, and to an encoder and to an encoding method.

BACKGROUND OF THE INVENTION

Bit-errors can occur on the transmission chain between the encoder and the decoder. Untreated bit-errors can lead to annoying artefacts; therefore, many audio decoders just simply trigger frame loss/packet loss concealment (PLC) on a full frame, subsequently referred to as full frame loss concealment (FFLC), if any bit-error is detected within this frame. Often, this achieves a good audio quality, especially when the signal is stationary.

MPEG-4 Part 3 Audio [1] defines error sensitivity categories for the bitstream payload of AAC (Table 4.94); Table 1 shows the categories for the AAC main data. In particular, table 1 depicts error sensitivity categories for AAC.

TABLE 1

| category | Payload | mandatory | leads/may lead to one instance per | Description |
|---|---|---|---|---|
| 0 | Main | yes | CPE/stereo layer | commonly used side information |
| 1 | main | yes | ICS | channel dependent side information |
| 2 | main | no | ICS | error resilient scale factor data |
| 3 | main | no | ICS | TNS data |
| 4 | main | yes | ICS | spectral data |

Depending on the distorted classes, individual concealment strategies are chosen as denoted in Table 2. Table 2 depicts concealment strategies for AAC error sensitivity categories.

TABLE 2

| Category | Concealment strategy |
|---|---|
| 0 | Frame loss concealment |
| 1 | Channel concealment (in case of multi-channel signals) |
| 2 | Conceal just the spectral lines of distorted scale factor bands [2] |
| 3 | Do not apply TNS in case of bit-errors |
| 4 | Decode spectrum regardless of bit-errors |

MPEG-4 Part 3 Audio also specifies Bit Sliced Arithmetic Coding (BSAC), which allows fine-grain scalability with a high number of layers. To improve the error resilience, Segmented Binary Arithmetic (SBA) Coding was introduced, which groups multiple layers into segments. Arithmetic coding is re-initialized at the beginning of each segment to circumvent error propagation.

An adaptive selection of time-domain or frequency-domain concealment is proposed in [3]. In [3], three error detection methods are described.

A first error detection method uses a cyclic redundancy check (CRC).

A second error detection method compares the length of a bitstream payload as transmitted from an encoder with the length of the bitstream payload given to the decoder.

A third error detection method compares the length of a bitstream payload as transmitted from an encoder with the length of the consumed bits during the decoding process of the bitstream payload: In BSAC, 32 additional bits or less can be decoded due to characteristics of the arithmetic decoding. Therefore, if the bit difference is more than 32 bits, it is determined that an error exists.

Subsequently in [3], a plurality of error location methods are described:

According to a first error location method of [3], a comparison of spectral energy of the current frame with that of the previous frame is conducted.

According to a second error location method of [3], an examination of bits allocated to each layer of the decoded bitstream payload relative to the number of bits consumed by the arithmetic decoder is conducted. When errors exist in a layer, more or less bits might be used in the arithmetic decoding. Therefore, a layer using more or less bits indicates a high possibility that errors exist in this layer or in a previous layer.

Following up on this location, different concealment strategies are suggested in [3]: If the detected position is before a first critical position, time domain concealment is applied. If the detected position is after a first critical position, but before a second critical position, frequency domain concealment is applied. If the detected position is after a second critical position, concealment is not applied.

Various frame loss concealment techniques available in the frequency domain are discussed in [4]. In particular, muting, repetition, noise substitution and prediction are mentioned in [4].

SUMMARY

According to an embodiment, a decoder for decoding a frame to reconstruct a signal portion of a signal, wherein the signal portion is encoded within the frame, wherein the frame includes a bitstream payload and two or more redundancy bits, wherein the bitstream payload includes a plurality of payload bits, wherein each of the payload bits exhibits a position within the bitstream payload, may have: a channel decoding module, being configured to detect, depending on the two or more redundancy bits, whether the bitstream payload includes one or more corrupted bits being one or more of the payload bits that are distorted or that are likely to be distorted, a source decoding module, wherein, if the channel decoding module has not detected any corrupted bits within the bitstream payload, the source decoding module is configured to decode the bitstream payload without conducting error concealment to reconstruct the signal portion, wherein, if the channel decoding module has detected the one or more corrupted bits within the bitstream payload, the source decoding module is configured to select a selected error concealment mode of two or more error concealment modes depending on the position of at least one of the one or more corrupted bits within the bitstream payload and depending on a signal characteristic of the signal portion of the signal, and is configured to conduct error concealment depending on the selected error concealment mode to reconstruct the signal portion.

According to another embodiment, a system may have: an encoder for encoding a signal portion of a signal within a frame, wherein the encoder is configured to generate the frame so that the frame includes a bitstream payload and two or more redundancy bits, wherein the bitstream payload includes a plurality of payload bits, wherein each of the payload bits exhibits a position within the bitstream payload, and an inventive decoder.

According to another embodiment, an encoder may have: a source encoding module for encoding a signal portion of a signal within a frame, wherein the source encoding module is configured to generate the frame so that the frame includes a bitstream payload and two or more redundancy bits, wherein the bitstream payload includes a plurality of payload bits, wherein each of the payload bits exhibits a position within the bitstream payload, wherein the frame being generated by the source encoding module is suitable for being processed by the inventive decoder, and a channel encoding module being configured to generate the two or more redundancy bits depending on the bitstream payload.

According to another embodiment, a method for decoding a frame to reconstruct a signal portion of a signal, wherein the signal portion is encoded within the frame, wherein the frame includes a bitstream payload and two or more redundancy bits, wherein the bitstream payload includes a plurality of payload bits, wherein each of the payload bits exhibits a position within the bitstream payload, may have the steps of: detecting, depending on the two or more redundancy bits, whether the bitstream payload includes one or more corrupted bits being one or more of the payload bits that are distorted or that are likely to be distorted, if no corrupted bits have been detected within the bitstream payload, decoding the bitstream payload without conducting error concealment to reconstruct the signal portion, and if one or more corrupted bits have been detected within the bitstream payload, selecting a selected error concealment mode of two or more error concealment modes depending on the position of at least one of the one or more corrupted bits within the bitstream payload and depending on a signal characteristic of the signal portion of the signal, and conducting error concealment depending on the selected error concealment mode to reconstruct the signal portion.

According to another embodiment, a method may have the steps of: encoding a signal portion of a signal within a frame, wherein the frame is generated so that the frame includes a bitstream payload and two or more redundancy bits, wherein the bitstream payload includes a plurality of payload bits, wherein each of the payload bits exhibits a position within the bitstream payload, and conducting the method for decoding a frame to reconstruct a signal portion of a signal, wherein the signal portion is encoded within the frame, wherein the frame includes a bitstream payload and two or more redundancy bits, wherein the bitstream payload includes a plurality of payload bits, wherein each of the payload bits exhibits a position within the bitstream payload, wherein the method may have the steps of: detecting, depending on the two or more redundancy bits, whether the bitstream payload includes one or more corrupted bits being one or more of the payload bits that are distorted or that are likely to be distorted, if no corrupted bits have been detected within the bitstream payload, decoding the bitstream payload without conducting error concealment to reconstruct the signal portion, and if one or more corrupted bits have been detected within the bitstream payload, selecting a selected error concealment mode of two or more error concealment modes depending on the position of at least one of the one or more corrupted bits within the bitstream payload and depending on a signal characteristic of the signal portion of the signal, and conducting error concealment depending on the selected error concealment mode to reconstruct the signal portion, using the frame.

According to another embodiment, a method for encoding a signal portion of a signal within a frame may have the steps of: generating the frame so that the frame includes a bitstream payload and two or more redundancy bits, wherein the bitstream payload includes a plurality of payload bits, wherein each of the payload bits exhibits a position within the bitstream payload, wherein the frame is suitable for being decoded by the method for decoding a frame to reconstruct a signal portion of a signal, wherein the signal portion is encoded within the frame, wherein the frame includes a bitstream payload and two or more redundancy bits, wherein the bitstream payload includes a plurality of payload bits, wherein each of the payload bits exhibits a position within the bitstream payload, wherein the method may have the steps of: detecting, depending on the two or more redundancy bits, whether the bitstream payload includes one or more corrupted bits being one or more of the payload bits that are distorted or that are likely to be distorted, if no corrupted bits have been detected within the bitstream payload, decoding the bitstream payload without conducting error concealment to reconstruct the signal portion, and if one or more corrupted bits have been detected within the bitstream payload, selecting a selected error concealment mode of two or more error concealment modes depending on the position of at least one of the one or more corrupted bits within the bitstream payload and depending on a signal characteristic of the signal portion of the signal, and conducting error concealment depending on the selected error concealment mode to reconstruct the signal portion, and generating the two or more redundancy bits depending on the bitstream payload.

Another embodiment may have a non-transitory digital storage medium having a computer program stored thereon to perform any of the inventive methods when said computer program is run by a computer.

Another embodiment may have a frame being generated according to the method for encoding a signal portion of a signal within a frame, wherein the method may have the steps of: generating the frame so that the frame includes a bitstream payload and two or more redundancy bits, wherein the bitstream payload includes a plurality of payload bits, wherein each of the payload bits exhibits a position within the bitstream payload, wherein the frame is suitable for being decoded by the method for decoding a frame to reconstruct a signal portion of a signal, wherein the signal portion is encoded within the frame, wherein the frame includes a bitstream payload and two or more redundancy bits, wherein the bitstream payload includes a plurality of payload bits, wherein each of the payload bits exhibits a position within the bitstream payload, wherein the method may have the steps of: detecting, depending on the two or more redundancy bits, whether the bitstream payload includes one or more corrupted bits being one or more of the payload bits that are distorted or that are likely to be distorted, if no corrupted bits have been detected within the bitstream payload, decoding the bitstream payload without conducting error concealment to reconstruct the signal portion, and if one or more corrupted bits have been detected within the bitstream payload, selecting a selected error concealment mode of two or more error concealment modes depending on the position of at least one of the one or more corrupted bits within the bitstream payload and depending on a signal characteristic of the signal portion of the signal, and conducting error concealment depending on the selected error concealment mode to reconstruct the signal portion, and generating the two or more redundancy bits depending on the bitstream payload.

A decoder for decoding a frame to reconstruct a signal portion of a signal is provided. The signal portion is encoded within the frame, wherein the frame comprises a bitstream payload and two or more redundancy bits, wherein the bitstream payload comprises a plurality of payload bits, wherein each of the payload bits exhibits a position within the bitstream payload. The decoder comprises a channel decoding module, being configured to detect, depending on the two or more redundancy bits, whether the bitstream payload comprises one or more corrupted bits being one or more of the payload bits that are distorted or that are likely to be distorted. Moreover, the decoder comprises a source decoding module. If the channel decoding module has not detected any corrupted bits within the bitstream payload, the source decoding module is configured to decode the bitstream payload without conducting error concealment to reconstruct the signal portion. If the channel decoding module has detected the one or more corrupted bits within the bitstream payload, the source decoding module is configured to select a selected error concealment mode of two or more error concealment modes depending on the position of at least one of the one or more corrupted bits within the bitstream payload and depending on a signal characteristic of the signal portion of the signal, and is configured to conduct error concealment depending on the selected error concealment mode to reconstruct the signal portion.

Moreover, an encoder is provided. The encoder comprises a source encoding module for encoding a signal portion of a signal within a frame, wherein the source encoding module is configured to generate the frame so that the frame comprises a bitstream payload and two or more redundancy bits, wherein the bitstream payload comprises a plurality of payload bits, wherein each of the payload bits exhibits a position within the bitstream payload, wherein the frame being generated by the source encoding module is suitable for being processed by the above-described decoder. Furthermore, the encoder comprises a channel encoding module being configured to generate the two or more redundancy bits depending on the bitstream payload.

Furthermore, a method for decoding a frame to reconstruct a signal portion of a signal is provided. The signal portion is encoded within the frame, wherein the frame comprises a bitstream payload and two or more redundancy bits, wherein the bitstream payload comprises a plurality of payload bits, wherein each of the payload bits exhibits a position within the bitstream payload. The method comprises:

Detecting, depending on the two or more redundancy bits, whether the bitstream payload comprises one or more corrupted bits being one or more of the payload bits that are distorted or that are likely to be distorted.

If no corrupted bits have been detected within the bitstream payload, decoding the bitstream payload without conducting error concealment to reconstruct the signal portion, and If one or more corrupted bits have been detected within the bitstream payload, selecting a selected error concealment mode of two or more error concealment modes depending on the position of at least one of the one or more corrupted bits within the bitstream payload and depending on a signal characteristic of the signal portion of the signal, and conducting error concealment depending on the selected error concealment mode to reconstruct the signal portion.

Moreover, another method is provided. The method comprises:

Encoding a signal portion of a signal within a frame, wherein the encoder is configured to generate the frame so that the frame comprises a bitstream payload and two or more redundancy bits, wherein the bitstream payload comprises a plurality of payload bits, wherein each of the payload bits exhibits a position within the bitstream payload. And:

Conducting, using the frame, the above-described method for decoding the frame.

Furthermore, a method for encoding a signal portion of a signal within a frame is provided. The method comprises:

Generating the frame so that the frame comprises a bitstream payload and two or more redundancy bits, wherein the bitstream payload comprises a plurality of payload bits, wherein each of the payload bits exhibits a position within the bitstream payload, wherein the frame is suitable for being decoded by the above-described method for decoding the frame. And:

Generating the two or more redundancy bits depending on the bitstream payload.

Moreover, computer program for implementing one of the above described methods is provided when said method is executed on a computer or signal processor.

Furthermore, a frame being generated according to the above-described method for encoding a signal portion of a signal within a frame is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
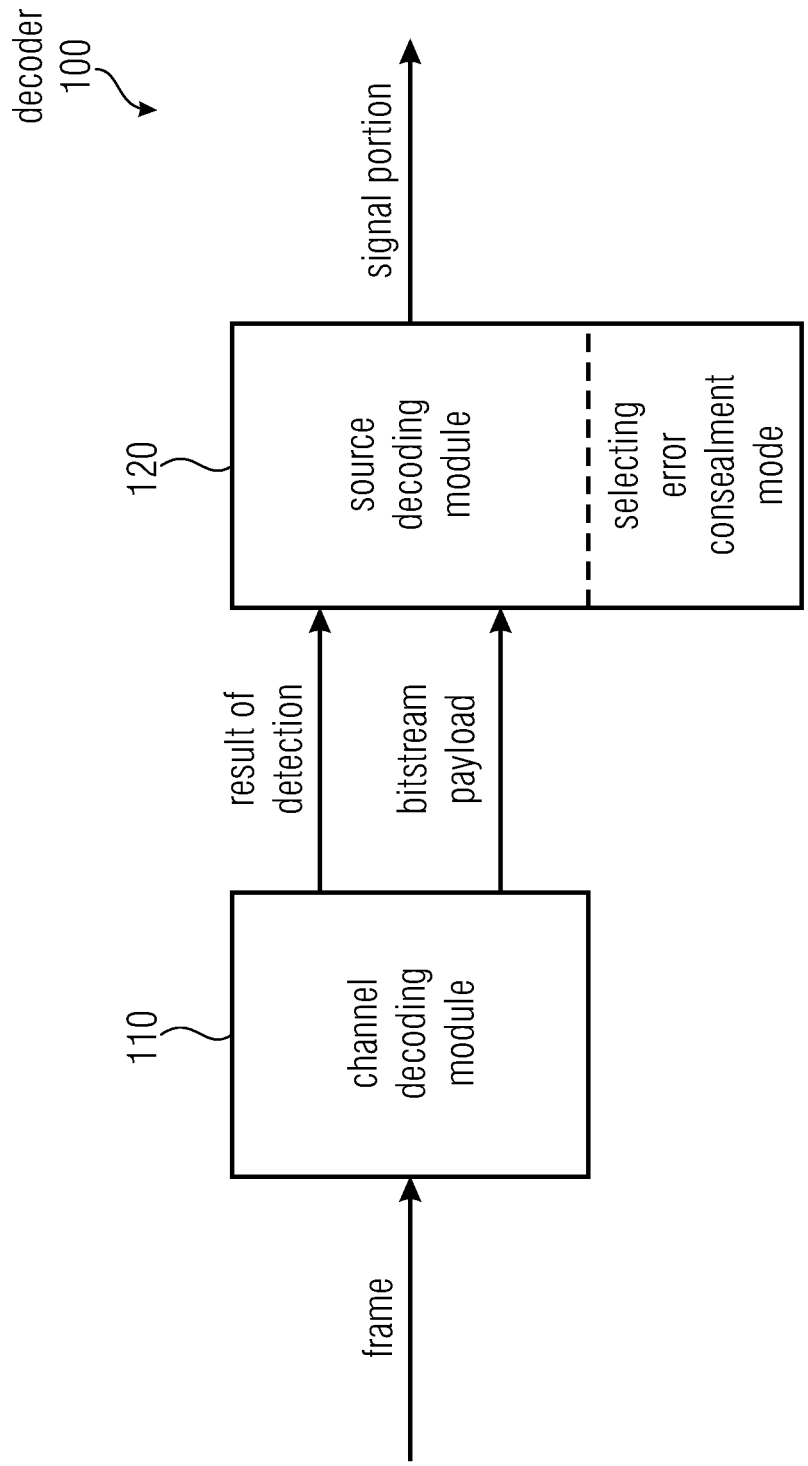
FIG. 1 illustrates a decoder for decoding a frame to reconstruct a signal portion of a signal according to an embodiment.

FIG. 1 illustrates a decoder 100 for decoding a frame to reconstruct a signal portion of a signal according to an embodiment.

The signal portion is encoded within the frame, wherein the frame comprises a bitstream payload and two or more redundancy bits, wherein the bitstream payload comprises a plurality of payload bits, wherein each of the payload bits exhibits a position within the bitstream payload.

The decoder 100 comprises a channel decoding module 110, being configured to detect, depending on the two or more redundancy bits, whether the bitstream payload comprises one or more corrupted bits being one or more of the payload bits that are distorted or that are likely to be distorted.

Moreover, the decoder 100 comprises a source decoding module 120.

If the channel decoding module 110 has not detected any corrupted bits within the bitstream payload, the source decoding module 120 is configured to decode the bitstream payload without conducting error concealment to reconstruct the signal portion.

If the channel decoding module 110 has detected the one or more corrupted bits within the bitstream payload, the source decoding module 120 is configured to select a selected error concealment mode of two or more error concealment modes depending on the position of at least one of the one or more corrupted bits within the bitstream payload and depending on a signal characteristic of the signal portion of the signal, and is configured to conduct error concealment depending on the selected error concealment mode to reconstruct the signal portion.

According to an embodiment, the channel decoding module may, e.g., be an error detection and error correction module being configured to conduct error correction on the bitstream payload before detecting whether the bitstream payload comprises the one or more corrupted bits.

In an embodiment, if the channel decoding module 110 determines that it cannot successfully conduct the error correction on the bitstream payload, the channel decoding module 110 may, e.g., be configured to determine said one or more corrupted bits within the bitstream payload.

According to an embodiment, a first one of the two or more error concealment modes may, e.g., be a full frame loss concealment mode. If the channel decoding module 110 has indicated that the bitstream payload comprises the one or more corrupted bits, and if the selected error concealment mode is the full frame loss concealment mode, the source decoding module 120 may, e.g., be configured to conduct error concealment without using the bitstream payload.

In an embodiment, a second one of the two or more error concealment modes may, e.g., be a partial frame loss concealment mode. If the channel decoding module 110 has indicated that the bitstream payload comprises the one or more corrupted bits, and if the selected error concealment mode is the partial frame loss concealment mode, the source decoding module 120 may, e.g., be configured to obtain the decoded signal by decoding other bits of the payload bits that are not indicated by the channel decoding module 110 to be the one or more corrupted bits without conducting error concealment on the other bits, and by conducting error concealment on the one or more of the payload bits that are indicated by the channel decoding module 110 to be the one or more corrupted bits.

According to an embodiment, the two or more error concealment modes may e.g., comprise exactly two error concealment modes, wherein a first one of the exactly two error concealment modes may, e.g., be the full frame loss concealment mode, wherein a second one of the exactly two error concealment modes is the partial frame loss concealment mode.

In an embodiment, the bitstream payload may, e.g., be partitioned into a first part of the plurality of payload bits of the bitstream payload, and into a second part of the plurality of payload bits of the bitstream payload. If the channel decoding module 110 has indicated that the bitstream payload comprises the one or more corrupted bits, and if the first part of the bitstream payload comprises at least one of the one or more corrupted bits, the source decoding module 120 may, e.g., be configured to select the full frame loss concealment mode as the selected error concealment mode. If the channel decoding module 110 has indicated that the bitstream payload comprises the one or more corrupted bits, and if the first part of the bitstream payload does not comprise any of the one or more corrupted bits, the source decoding module 120 may, e.g., be configured to select the selected error concealment mode depending on the signal characteristic of the signal portion of the signal.

According to an embodiment, the frame is a current frame, wherein the bitstream payload is a current bitstream payload, wherein the plurality of payload bits is a plurality of current payload bits, wherein the signal portion of the signal is a current signal portion of the signal, and wherein the signal characteristic is a current signal characteristic. If the channel decoding module 110 has indicated that the current bitstream payload comprises the one or more corrupted bits, the source decoding module 120 may, e.g., be configured to select the selected error concealment mode of two or more error concealment modes depending on the current signal characteristic of the current signal portion of the signal being encoded by the plurality of current payload bits of the current frame, and depending on a previous signal characteristic of a previous signal portion of the signal being encoded by a plurality of previous payload bits of a previous bitstream payload of a previous frame.

In an embodiment, the current signal portion of the signal being encoded by the plurality of current payload bits of the current bitstream payload may, e.g., be a current audio signal portion of an audio signal, and the previous signal portion of the signal being encoded by the plurality of previous payload bits of the previous bitstream payload may, e.g., be a previous audio signal portion of the audio signal. The current bitstream payload may, e.g., encode a plurality of spectral lines of the current audio signal portion.

In an embodiment, if the corrupted bits only affect the residual bits, then no error concealment is done and the frame is decoded as normal frame without considering the corrupted residual bits.

A stability factor represents the similarity between two signals, for example, between the current signal and a past signal. For example, the stability factor may, e.g., be bounded by [0:1]. A stability factor close to 1 or 1 may, e.g., mean that both signals are very similar and a stability factor close to 0 or 0 may, e.g., mean that both signals are very different. The similarity may, for example, be calculated on the spectral envelopes of two audio signals.

In an embodiment, full frame loss concealment is conducted, if a stability factor is lower than a threshold, for example, a threshold 0.5.

According to an embodiment, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the full frame loss concealment mode as the selected error concealment mode, if the previous frame was concealed using full frame loss concealment.

In an embodiment, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the full frame loss concealment mode as the selected error concealment mode, if a highest spectral line among the plurality of spectral lines of the current audio signal portion exhibits a frequency being smaller than or equal to a threshold frequency.

According to an embodiment, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the full frame loss concealment mode as the selected error concealment mode, if a stability factor is smaller than a predefined threshold, wherein said stability factor indicates a stability of the current audio signal portion and of the previous audio signal portion. For example, the predefined threshold may, e.g., be equal to 0.5.

According to an embodiment, wherein, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the full frame loss concealment mode as the selected error concealment mode, if the previous frame was concealed using full frame loss concealment; or if a stability factor is smaller than a predefined threshold, wherein said stability factor indicates a stability of the current audio signal portion and of the previous audio signal portion. For example, the predefined threshold may, e.g., be equal to 0.5.

In an embodiment, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the full frame loss concealment mode as the selected error concealment mode, if the highest spectral line among the plurality of spectral lines of the current audio signal portion represents said frequency being smaller than or equal to said threshold frequency, and if the first part of the current bitstream payload encodes a signal component of the audio signal which is tonal or harmonic, and if the previous signal portion encodes at least one peak of the audio signal being greater than a peak threshold value and which corresponds to a frequency being greater than all frequencies being indicated by the plurality of spectral lines of the current audio signal portion.

In another embodiment, a pitch of the audio signal may, e.g., exhibit a pitch frequency. If the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the full frame loss concealment mode as the selected error concealment mode, if the highest spectral line among the plurality of spectral lines of the current audio signal portion represents said frequency being smaller than or equal to said threshold frequency, and if the first part of the current bitstream payload encodes a signal component of the audio signal which is tonal or harmonic, and if all frequencies being indicated by the plurality of spectral lines of the current audio signal portion are smaller than a maximal supported pitch frequency.

In an embodiment, full frame loss concealment is conducted, if the stability factor is higher than or equal to the threshold, for example, the threshold 0.5, and if the bitstream payload does not encode a signal component of the audio signal which is tonal or harmonic, and if the ratio between the energy from 0 to the frequency bin $k_{be}-1$ of the previous quantized spectrum of the previous audio signal to the energy from 0 to the top of the previous quantized spectrum of the previous audio signal is lower than a second threshold, for example, the second threshold 0.3.

According to an embodiment, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the partial frame loss concealment mode as the selected error concealment mode, if the previous frame was not concealed using full frame loss concealment, and if the highest spectral line among the plurality of spectral lines of the current audio signal portion exhibits a frequency being greater than said threshold frequency.

In an embodiment, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the partial frame loss concealment mode as the selected error concealment mode, if the previous frame was not concealed using full frame loss concealment, and if the highest spectral line among the plurality of spectral lines of the current audio signal portion exhibits said frequency being greater than said threshold frequency, and if said stability factor is greater than or equal to said predefined threshold, and if the first part of the current bitstream payload does not encode a signal component of the audio signal which is tonal or harmonic, and if the ratio between the energy from 0 to the frequency bin $k_{be}-1$ of the previous quantized spectrum of the previous audio signal to the energy from 0 to the top of the previous quantized spectrum of the previous audio signal is greater than or equal to said ratio threshold.

According to an embodiment, if the channel decoding module 110 has indicated that the current bitstream payload comprises the one or more corrupted bits, and if the first part of the current bitstream payload does not comprise any of the one or more corrupted bits, the source decoding module 120 may, e.g., be configured to select the partial frame loss concealment mode as the selected error concealment mode, if the previous frame was not concealed using full frame loss concealment, and if the highest spectral line among the plurality of spectral lines of the current audio signal portion exhibits said frequency being greater than said threshold frequency, and if said stability factor is greater than or equal to said predefined threshold, if the first part of the current bitstream payload encodes a signal component which is tonal or harmonic, and if said highest spectral line among the plurality of spectral lines of the current audio signal portion exhibits a frequency being greater than the pitch frequency, and if the previous signal portion does not encode any peak of the audio signal being greater than said peak threshold value and which corresponds to said frequency being greater than all frequencies being indicated by the plurality of spectral lines of the current audio signal portion.

In an embodiment, if the selected error concealment mode is the partial frame loss concealment mode, the source decoding module 120 may, e.g., be configured to determine for each code word of a plurality of code words of the second part of the bitstream payload, depending on a number of corrected symbols of said code word, whether or not to conduct error concealment for those of the plurality of spectral lines of the current audio signal portion being represented by said code word, and to conduct error concealment for said those of the plurality of spectral lines of the current audio signal portion, for which the source decoding module 120 has determined that error concealment shall be conducted.

According to an embodiment, for each code word of a plurality of code words of the second part of the bitstream payload, the source decoding module 120 may, e.g., be configured to determine a risk value indicating an approximation of a probability that said code word is corrupt, and to determine whether or not said risk value is greater than a risk threshold.

In an embodiment, the source decoding module 120 may, for example, be configured to determine the risk value further depending on a forward error correction coding mode.

According to an embodiment, the risk threshold may, e.g., be $2^{-16}$.

In other embodiments, another risk threshold may, e.g., be employed, for example, $2^{-12}$, or, for example, $2^{-18}$, or, for example, $2^{-20}$.

In an embodiment, the source decoding module 120 may, e.g., be configured to calculate the risk value, for example, as follows:

$$r(m, \tau) := 16^{-2(m-1)} \binom{14}{\tau} 15^{\tau}.$$

wherein m indicates an epmode (e.g., the forward error correction coding mode), and wherein τ indicates a number of symbol errors (e.g., a number of corrected symbols).

The above formula may, e.g., be valid for m=2, 3, 4 and τ=0, . . . , m−1.

In other embodiments, the source decoding module 120 may, e.g., be configured to employ a lookup-table to determine the risk value depending on the number of symbol errors (e.g., the number of corrected symbols), and depending on the epmode (e.g., the forward error correction coding mode).

For example, in an embodiment, a lookup table as follows may, e.g., be employed.

| epmode\error count | 0 | 1 | 2 | 3 |
|---|---|---|---|---|
| 3 | $2^\wedge$ − 16 | 13385*$2^\wedge$ − 22 | 20475*$2^\wedge$ − 16 | not available |
| 4 | $2^\wedge$ − 24 | 13385*$2^\wedge$ − 30 | 20475*$2^\wedge$ − 24 | 19195*$2^\wedge$ − 18 |

In the above example, when, for example, a risk threshold of $2^{-16}$ is employed, it follows that in epmode 3, no errors are allowed, and in epmode 4, at most 1 error is allowed.

In other embodiments, the lookup table may take different values for the risk value, for the epmode and for the error count (for example, taking even more errors 4, 5, 6, etc., or only fewer errors into consideration).

In other embodiments, the risk value may, e.g., be determined by the codeword length or in another way.

For example, some embodiments may, e.g., employ a different calculation of the risk value, e.g., $$r(m, \tau) := 12^{-2(m-1)} \binom{14}{\tau} 16^{\tau},$$

or, e.g., $$r(m, \tau) := 10^{-2(m-1)} \binom{14}{\tau} 8^{\tau}.$$

Moreover, further embodiments may, e.g., only depend on the number of symbol errors but not on a forward error correction coding mode.

For example, in such embodiments, the risk value, may, e.g., be calculated as follows:

$$r(m, \tau) := 16^{-6} \binom{14}{\tau} 15^{\tau},$$

or according to $$r(m, \tau) := 8^{-6} \binom{14}{\tau} 14^{\tau},$$

or according to $$r(m, \tau) := 4^{-6} \binom{14}{\tau} 18^{\tau}.$$

In an embodiment, if said risk value is greater than said risk threshold, the source decoding module 120 may, e.g., be configured to conduct error concealment for those of the plurality of spectral lines of the current audio signal portion being represented by said code word.

In an embodiment, the source decoding module 120 is configured to conduct said error concealment for said code word is conducted in the partial frame loss error concealment mode.

According to an embodiment, the channel decoding module 110 may, e.g., be configured to detect that the bitstream payload comprises one or more corrupted bits, if the channel decoding module 110 encounters an uncorrectable code word within the bitstream payload and/or if the channel decoding module 110, after conducting error correction on a plurality of code words of the bitstream payload, determines a re-calculated hash value, which depends on said plurality of code words after the error correction, that differs from a received hash value.

Figure 2:
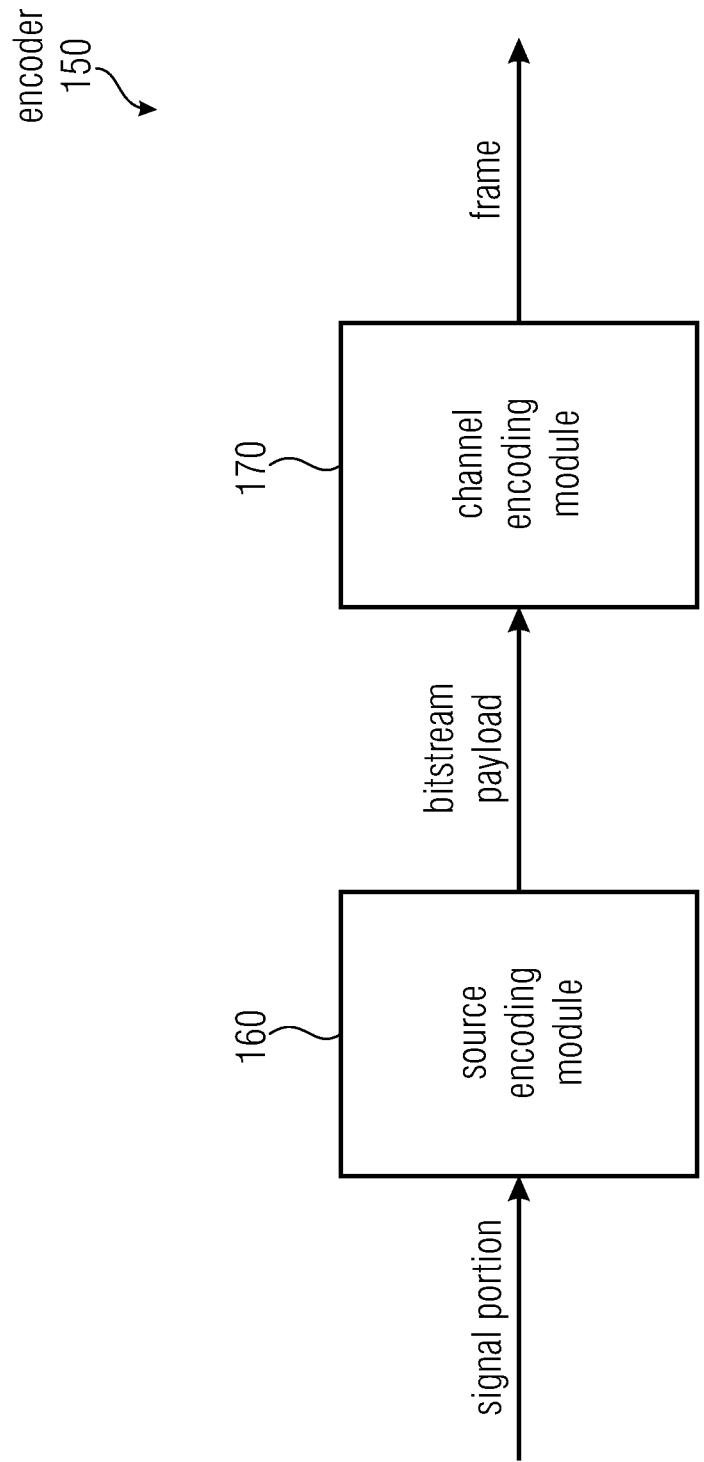
FIG. 2 illustrates an encoder according to an embodiment.

FIG. 2 illustrates an encoder 150 according to an embodiment.

The encoder 150 comprises a source encoding module 160 for encoding a signal portion of a signal within a frame, wherein the source encoding module 160 is configured to generate the frame so that the frame comprises a bitstream payload and two or more redundancy bits, wherein the bitstream payload comprises a plurality of payload bits, wherein each of the payload bits exhibits a position within the bitstream payload, wherein the frame being generated by the source encoding module 160 is suitable for being processed by the above-described decoder 100.

Furthermore, the encoder 150 comprises a channel encoding module 170 being configured to generate the two or more redundancy bits depending on the bitstream payload.

Figure 3:
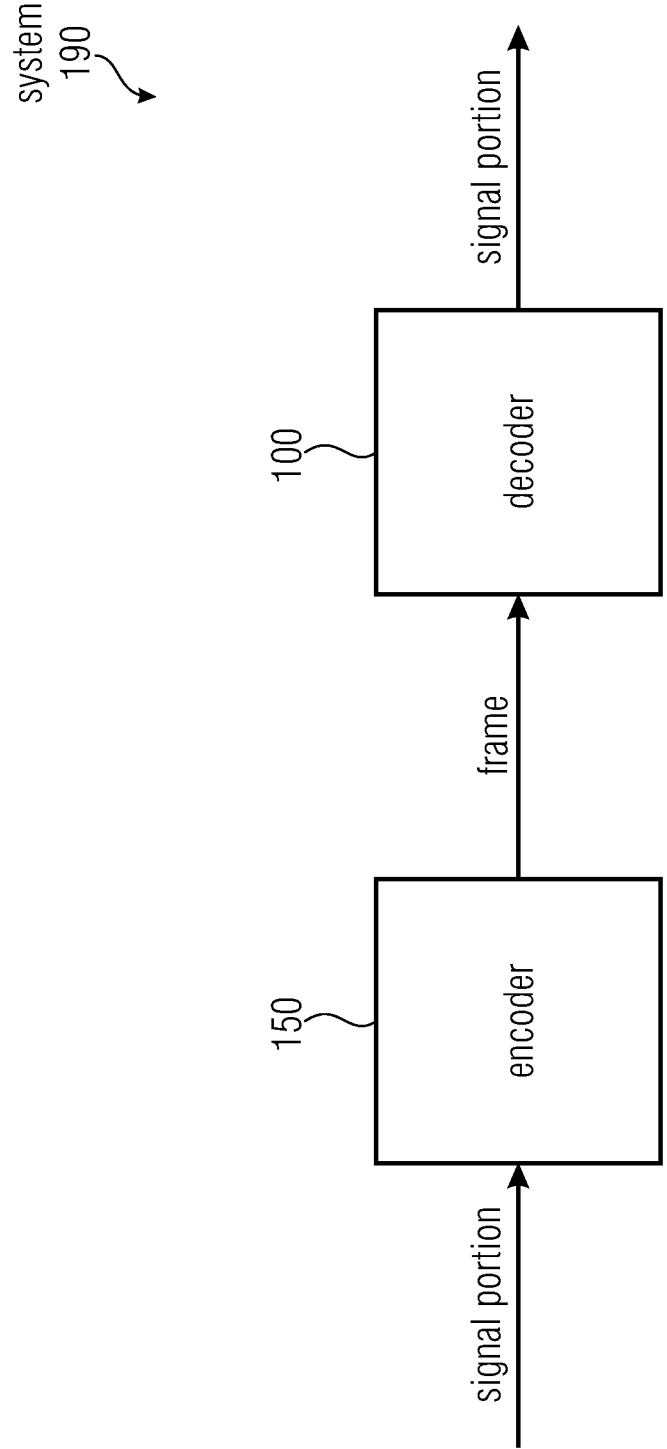
FIG. 3 illustrates a system according to an embodiment.

FIG. 3 illustrates a system 190 according to an embodiment.

The system 190 comprises the encoder 150 of FIG. 2 for encoding a signal portion of a signal within a frame, wherein the encoder 150 is configured to generate the frame so that the frame comprises a bitstream payload and two or more redundancy bits, wherein the bitstream payload comprises a plurality of payload bits, wherein each of the payload bits exhibits a position within the bitstream payload.

Moreover, the system 190 comprises the decoder 100 of FIG. 1.

In the following, mode decision concepts according to embodiments are described. In particular, mode decision and application of bit-error concealment concepts are described.

Some embodiments are based on the finding, that instead of employing full frame loss concealment, when the signal is non-stationary and the bit-errors appear only in psychoacoustically less important signal data, partial frame loss concealment (PFLC), i.e. concealing only the distorted data, would be advantageous, since concealment artefacts would then only show up in the psychoacoustically less important part, leading to a better audio quality.

In some embodiments, to achieve the best audio quality in bit-error impaired transmissions, a mode decision is invented to choose between FFLC and PFLC. This decision depends on the likelihood of an error within the psychoacoustically more important signal data and the signal characteristic of the last and current frame.

The decision, whether to apply full frame loss concealment or partial frame loss concealment is a joint decision of channel coding and source coding:

The channel decoding module proposes to apply:

Full frame loss concealment, if bits in the more sensitive part of the bitstream payload are likely to be corrupt—regardless of the possibility of errors in the less sensitive part of the bitstream payload.

Partial frame loss concealment, if bits in the more sensitive part of the bitstream are likely to be correct, but if bits in the less sensitive part of the bitstream payload are likely to be corrupt.

The likelihood of a certain part of a bitstream to be corrupt is provided by the channel decoding module. The channel coding is performed using block codes. Beside the error correction capability, it also provides a distinct error detection capability. Additionally, individual hashes are derived over the more and the less sensitive part of the bitstream. The evaluation of these hashes provides further certainty regarding to the aforementioned likelihood.

Source coding, e.g., if the channel coding opts for partial frame loss concealment, is described in the following.

In an embodiment, the source decoding module 120 may, e.g., be configured to select to apply full frame loss concealment,
  if the previous frame was concealed with full frame loss concealment, or
  if the highest spectral line in the quantized spectrum represents a frequency smaller or equal than a threshold frequency (i.e. 2 kHz) and
    the stability of the current and last signal is lower than a given threshold, or
    a pitch is transmitted (in the more sensitive bitstream payload) and
      the highest available spectral line in the quantized spectrum represents a frequency smaller than the pitch frequency, or
      there are relevant peaks in the previous decoded spectrum part above the highest available spectral line,
    or
    no pitch is transmitted (in the more sensitive bitstream payload) and not enough spectral lines are available in the quantized spectrum.

In contrast, the source decoding module 120 may, e.g., be configured to select to apply partial frame loss concealment,
  if the previous frame was not concealed with full frame loss concealment and
    if the highest spectral line in the quantized spectrum represents a frequency higher than a threshold frequency (i.e. 2 kHz), or
    if the stability of the current and last signal is higher or equal than a given threshold and
      if no pitch is transmitted and at least a certain amount of spectral lines are available in the quantized spectrum, or
      if a pitch is transmitted and the highest available spectral line in the quantized spectrum represents a frequency higher than the pitch frequency and there are no relevant peaks in the previous decoded spectrum part above the highest available spectral line.

Such embodiments are based on the finding that full-frame pitch-based concealment, like time domain concealment, may, e.g., be applied if the signal is stationary and monophonic (indicated by an available pitch) and the retrieved spectrum is not representative (indicated by at least one of the two above-mentioned criteria), since under those conditions it provides in general better results than partial frame loss concealment.

Partial frame loss concealment may, e.g., be applied if the signal is non-stationary or polyphonic (indicated by an absent pitch) or if the signal is stationary and monophonic (indicated by an available pitch) and the retrieved spectrum is representative (indicated by the two above-mentioned criteria), since under those conditions it provides in general better results than any full frame loss concealment.

In the following, mode decision concepts according to some embodiments are described in more detail.

In some embodiments, the part of the bitstream designated for partial frame loss concealment may, e.g., be encoded in multiple code words and—in addition—protected, as a whole by a hash value which may, e.g., be transmitted to the channel decoding module along with the bitstream. Each code may, e.g., have a certain error correction capability. In embodiments, the channel decoding module may, e.g., first attempt to perform error correction on the designated code words, thereby keeping track of the number of corrected symbols for each of them.

In such embodiments, if not all errors were corrected, or if it is likely that not all errors were corrected, then an appropriate error concealment mode will be selected and error concealment will be conducted depending on the selected error concealment mode.

In some embodiments, partial frame loss concealment may, e.g., be triggered, if an uncorrectable code word is encountered; or if all code words were corrected and the re-calculated hash value does not match the received hash value.

The latter is for instance the case, if the channel decoding module erroneously corrected received code words, which have been damaged beyond the limits of the error correction capability provided by the underlying code.

If one of these cases occurs, an analysis of the individual code words follows:

By evaluating the number of corrected symbols for each code word it is decided, whether a subpart of the part of the bitstream being designated for partial frame loss concealment can still be trusted. For this, the probability of drawing a random word that can be corrected to be a valid code word with the given number of modified symbols is evaluated (which may, e.g., be referred to as a risk value). If this probability is above a certain threshold (e.g. $2^{\{-16\}}$)

(which may, e.g., be referred to as a risk threshold), the corresponding bitstream area is marked as corrupt, otherwise it is treated as correct. This means, that the part indicated to be concealed with partial frame loss concealment (code words marked as corrupt) shrinks. This leads to a better audio quality, since the bits marked as correct of the part of the bitstream designated for partial frame loss concealment can be used by the decoder 100 jointly with the bits of the bitstream representing the psychoacoustically more important signal data.

Figure 4:
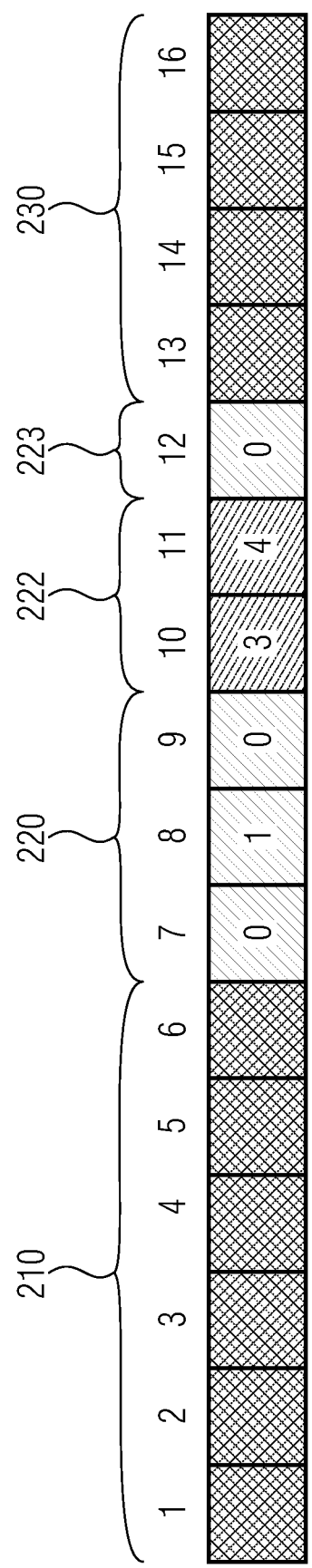
FIG. 4 illustrates an example for analysing payload data of code words according to an embodiment.

FIG. 4 illustrates an examples for analysing payload data of code words according to an embodiment.

In the example of FIG. 4, 16 code words are displayed (numbered 1 to 16), where the cross-shaped blocks 210 and 230 correspond to the more sensitive part of the bitstream, while the other blocks (blocks 220, 222, 223) correspond to the less sensitive part, designated for partial frame loss concealment. Within the illustrated codewords 7 to 12, the numbers of corrected symbols are displayed.

It may be assumed that a number of corrected symbols up to "1" leaves an error detection probability lower than the threshold, and a number of corrected symbols higher than "1" leaves an error detection probability higher than the threshold.

In the example of FIG. 4, code words with numbers lower than or equal to "1" are marked as correct (code words 7, 8, 9 and 12: left-bottom-to-right-top-shaped), and the remaining code words, i.e. code words with numbers higher than "1" are marked as corrupt (code words: 10 and 11: left-top-to-right-bottom-shaped), see FIG. 4. In the given example in FIG. 4 this means that the signal part coded inside the codewords 7, 8, 9 and 12 can still be decoded and only the signal part coded inside the codewords 10 and 11 has to be concealed by partial frame loss concealment.

In an embodiment, the decoder 100 may, e.g., apply full frame loss concealment (FFLC if the previous frame was concealed with frame loss concealment or for the following five events (event 1 to event 5):

Event 1: If bits in the more sensitive part of the bitstream payload are likely to be corrupt.

Event 2: If the stability of the current and last signal is lower than 0.5, in an embodiment for LC3, the stability is given by the stability factor θ which is calculated as:

$$\theta = 1.25 - \frac{1}{25}\sum_{k=0}^{N-1}(scfQ_{curr}(k) - scfQ_{prev}(k))^2$$

wherein:
scf $Q_{curr}$ indicates a scalefactor vector of the current frame, and
scf $Q_{prev}$ indicates a scalefactor vector of the previous frame
N indicates the number of scalefactors within the scalefactor vectors
θ indicates a stability factor, which is bounded by $0 \leq \theta \leq 1$
k indicates an index for a scalefactor vector Event 3: If the stability factor is higher or equal to 0.5 and if a pitch being sent in the more sensitive bitstream payload and the highest available spectral line in the quantized spectrum represents a frequency smaller than (depending on the employed embodiment): the maximally possible pitch frequency; or: the pitch frequency sent in the more sensitive bitstream payload.

Event 4: If the stability factor is higher or equal to 0.5 and if a pitch being sent in the more sensitive bitstream payload, and $k_{be}$, which is the first spectral bin that could not be recovered in the less sensitive bitstream payload, is lower than a calculated spectral bin index $k_{peak}$.

This index corresponds to the highest relevant peak in the previous decoded spectrum and is determined through a peak detector algorithm. The realization of the peak detector is shown in the following example pseudo code:

```
function [k_peak] = pc_peak_detector(X̂_prev, N_F)
block_size = 3;
thresh1 = 8;
fac = 0.3;
mean_block_nrg = mean(X̂_prev.^2);
maxPeak = 0;
k_peak = 0;
if abs(X̂_prev(0)) > abs(X̂_prev(1))
    block_cent = sum(X̂_prev(0:1).^2);
    if block_cent/block_size > thresh1*mean_block_nrg
        cur_max = max(abs(X̂_prev(0:1) ) ) ;
        next_max = max(abs(X̂_prev(2:2+block size-1))) ;
        if cur_max > next_max
            maxPeak = block_cent;
            k_peak = 1;
for k = 0:block_size-1
    if abs(X̂_prev(k+1)) >= abs(X̂_prev(k)) && abs(X̂_prev(k+1)) >= abs(X̂_prev(k+2))
        block_cent = sum(X̂_prev(k:k+block_size-1).^2);
        if block_cent/block_size > thresh1*mean_block_nrg
            cur_max = max(abs(X̂_prev(k:k+block_size-1)));
            prev_max = 0;
            for j = k-block_size:k-1
                if j > 0
                    prev_max = max(abs(X̂_prev(j))) ,
prev_max);
            next_max =
max(abs(X̂_prev(k+block_size:k+2*block_size-1)));
            if cur_max >= prev_max && cur_max > next_max
                if block_cent > fac*maxPeak
                    k_peak = k+block_size-1;
                    if block_cent >= maxPeak
                        maxPeak = block_cent;
for k = block_size..N_F-(2*block_size)
    if abs(X̂_prev(k+1)) >= abs(X̂_prev(k)) && abs(X̂_prev(k+1)) >= abs(X̂_prev(k+2))
        block_cent = sum(X̂_prev(k:k+block_size-1).^2);
        if block_cent/block_size > thresh1*mean_block_nrg
            cur_max = max(abs(X̂_prev(k:k+block_size-1))) ;
            prev_max = max(abs(X̂_prev(k-block_size:k-1)));
            next_max =
max(abs(X̂_prev(k+block_size:k+2*block_size-1)));
            if cur_max >= prev_max && cur_max > next_max
                if block_cent > fac*maxPeak
                    k_peak = block_size-1;
                    if block_cent >= maxPeak
                        maxPeak = block_cent;
``` wherein:
k indicates a spectral bin,
$N_F$ indicates the number of spectral lines, and
$\hat{X}_{prev}$ indicates the decoded spectrum of the last non-FFLC frame.

Event 5: If the stability factor is higher or equal to 0.5, and if no pitch is being sent in the more sensitive bitstream payload and the ratio between the partial to the full energy calculated on the last quantized spectrum is lower than 0.3:

$$\sum_{k=0}^{k_{be}-1}\widetilde{X_{q,lG}}(k)^2 < 0.3\sum_{k=0}^{N_F-1}\widetilde{X_{q,lG}}(k)^2$$

wherein:
k indicates a spectral bin,
$k_{be}$ indicates the first spectral bin which could not be recovered,
$N_F$ indicates the number of spectral lines,
$\widetilde{X_{q,lG}}(k)$ indicates the quantized spectrum of the last non-FFLC frame.

If none of the five events trigger or the previous frame was not concealed with full frame loss concealment and the first spectral bin which could not be recovered is higher than a threshold (i.e. representing a frequency of 2 kHz), partial frame loss concealment (PFLC) should be applied.

The following example pseudo code represents the upper description:

```
#if 1 /* choose the preferred embodiment by 0 or 1 */
pitchThresholdBin = maxPitchBin;
#else
pitchThresholdBin = currPitchBin;
#endif
concealMode = PFLC;
if prevBfi == FFLC;
    concealMode = FFLC;
else if k_be < bandwidth
    if 0 < 0.5
        concealMode = FFLC;
    else if pitch_present == 1
        k_peak = pc_peak_detector(X̂_prev, NF) ;
        if (k_be < k_peak || k_be < pitchThresholdBin)
            concealMode = FFLC;
    else
        part_nrg = sum(X̃_q,lG(0:k_be-1).^2);
        full_nrg = sum(X̃_q,lG(0:N_F-1).^2);
        if (part_nrg < 0.3*full_nrg)
            concealMode = FFLC;
``` where:
prevBfi—indicates the concealment method in the previous frame if applied
concealMode—indicates, whether FFLC or PFLC should be applied
pitch_present—indicates, whether a pitch is present in the current frame
pitchThresholdBin—indicates the bin, which needs to be at least available in order to perform PFLC
currPitchBin—indicates the current pitch
maxPitchBin—indicates the highest (maximum) pitch value which is supported
bandwidth—indicates the bandwidth bin, which needs to be at least available in order to not analyze the five conditions
$k_{be}$—first spectral bin which could not be recovered
$N_F$—number of spectral lines
$\hat{X}_{prev}$—decoded spectrum of the last non-FFLC frame
$\widetilde{X_{q,lG}}$ (k)—quantized spectrum of the last non-FFLC frame.

In the following, a Karnaugh-Map for concealment method selection depending on source coding is described There are five conditions that collectively determine which concealment method should be applied. They are subsequently assigned to logical variables are as follows:
a="The first part of the current bitstream payload does not encode a signal component that is tonal or harmonic"
b="The ratio between the energy from 0 to the frequency bin $k_{be}-1$ of the previous quantized spectrum and the energy from 0 to the top of the previous quantized spectrum is greater than or equal to a threshold"
c="The stability factor is higher than or equal to the threshold"
d="All the frequencies are smaller than pitch frequency or maximal supported pitch frequency"
e="The previous signal portion encodes at least one peak of the audio signal being greater than a peak threshold"
Using those variables, a 32($=2^5$) celled-K-map is created as depicted in table 3.

TABLE 3

| a | b |   |   |   |   |   |   |   |   |   |
|---|---|---|---|---|---|---|---|---|---|---|
| 0 | 0 | 0 | 1 | 0 | 0 | 0 | 0 | 0 | 0 |   |
| 0 | 1 | 0 | 1 | 0 | 0 | 0 | 0 | 0 | 0 |   |
| 1 | 1 | 0 | 1 | 1 | 0 | 0 | 1 | 1 | 0 |   |
| 1 | 0 | 0 | 0 | 0 | 0 | 0 | 0 | 0 | 0 |   |
|   |   | 0 | 1 | 1 | 0 | 0 | 1 | 1 | 0 | c |
|   |   | 0 | 0 | 1 | 1 | 1 | 1 | 0 | 0 | d |
|   |   | 0 | 0 | 0 | 0 | 1 | 1 | 1 | 1 | e |

Table 3 illustrates a 32 celled K-map shows graphically the logic triggering either of concealment methods The corresponding Boolean equations are as follows:

$$PFLC(1) = a'cd'e' + abc = c(a'd'e' + ab)$$

$$FELC(0) = ab' + c' + a'e + a'd = ab' + c' + a'(e+d)$$

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

"ISO/IEC14496-3 MPEG-4 Information technology-Coding of audio-visual objects-Part 3: Audio," 2009.
[2] R. Sperschneider, D. Homm and L.-H. Chambat, "Error Resilient Source Coding with Differential Variable Length Codes and its Application to MPEG Advance Audio Coding," in *Audio Engineering Societey*, Munich, 2002.
[3] E.-m. Oh, H.-s. Sung, K.-h. Choo and J.-h. Kim, "Method and apparatus to conceal error in decoded audio signal". U.S. Pat. No. 8,798,172 B2, 22 Nov. 2007.
[4] P. Lauber and R. Sperschneider, "Error Concealment for Compressed Digital Audio," in *Audio Society*, 2001.

The invention claimed is:

1. A decoder for decoding a frame to reconstruct a signal portion of a signal, wherein the signal portion is encoded within the frame, wherein the frame comprises a bitstream payload and two or more redundancy bits, wherein the bitstream payload comprises a plurality of payload bits, wherein each of the payload bits exhibits a position within the bitstream payload, wherein the decoder comprises:
a channel decoding module, being configured to detect, depending on the two or more redundancy bits, whether the bitstream payload comprises one or more corrupted bits being one or more of the payload bits that are distorted or that are likely to be distorted,
a source decoding module,
wherein, if the channel decoding module has not detected any corrupted bits within the bitstream payload, the source decoding module is configured to decode the bitstream payload without conducting error concealment to reconstruct the signal portion,
wherein, if the channel decoding module has detected the one or more corrupted bits within the bitstream payload, the source decoding module is configured to select a selected error concealment mode of two or more error concealment modes depending on the position of at least one of the one or more corrupted bits within the bitstream payload and depending on a signal characteristic of the signal portion of the signal, and is configured to conduct error concealment depending on the selected error concealment mode to reconstruct the signal portion;
wherein the bitstream payload is partitioned into a first part of the plurality of payload bits of the bitstream payload, and into a second part of the plurality of payload bits of the bitstream payload;
wherein the bitstream payload is a current bitstream payload;
wherein, if the first part of the current bitstream payload does not comprise any of the one or more corrupted bits, the source decoding module is configured to select a full frame loss concealment mode of the two or more error concealment modes as the selected error concealment mode, if a highest spectral line among a plurality of spectral lines of a current audio signal portion exhibits a frequency being smaller than or equal to a threshold frequency.

2. A decoder according to claim 1,
wherein the channel decoding module is an error detection and error correction module being configured to conduct error correction on the bitstream payload before detecting whether the bitstream payload comprises the one or more corrupted bits.

3. A decoder according to claim 1,
wherein a first one of the two or more error concealment modes is the full frame loss concealment mode,
wherein, if the channel decoding module has indicated that the bitstream payload comprises the one or more corrupted bits, and if the selected error concealment mode is the full frame loss concealment mode, the source decoding module is configured to conduct error concealment without using the bitstream payload.

4. A decoder according to claim 3,
wherein a second one of the two or more error concealment modes is a partial frame loss concealment mode,
wherein, if the channel decoding module has indicated that the bitstream payload comprises the one or more corrupted bits, and if the selected error concealment mode is the partial frame loss concealment mode, the source decoding module is configured to obtain the decoded signal by decoding other bits of the payload bits that are not indicated by the channel decoding module to be the one or more corrupted bits without conducting error concealment on the other bits, and by conducting error concealment on the one or more of the payload bits that are indicated by the channel decoding module to be the one or more corrupted bits.

5. A decoder according to claim 4,
wherein the two or more error concealment modes comprise exactly two error concealment modes, wherein a first one of the exactly two error concealment modes is the full frame loss concealment mode, wherein a second one of the exactly two error concealment modes is the partial frame loss concealment mode.

6. A decoder according to claim 4, wherein, if the channel decoding module has indicated that the bitstream payload comprises the one or more corrupted bits, and if the first part of the bitstream payload comprises at least one of the one or more corrupted bits, the source decoding module is configured to select the full frame loss concealment mode as the selected error concealment mode, and wherein, if the channel decoding module has indicated that the bitstream payload comprises the one or more corrupted bits, and if the first part of the bitstream payload does not comprise any of the one or more corrupted bits, the source decoding module is configured to select the selected error concealment mode depending on the signal characteristic of the signal portion of the signal.

7. A decoder according to claim 6, wherein the frame is a current frame, wherein the plurality of payload bits is a plurality of current payload bits, wherein the signal portion of the signal is a current signal portion of the signal, and wherein the signal characteristic is a current signal characteristic, wherein, if the channel decoding module has indicated that the current bitstream payload comprises the one or more corrupted bits, the source decoding module is configured to select the selected error concealment mode of two or more error concealment modes depending on the current signal characteristic of the current signal portion of the signal being encoded by the plurality of current payload bits of the current frame, and depending on a previous signal characteristic of a previous signal portion of the signal being encoded by a plurality of previous payload bits of a previous bitstream payload of a previous frame.

8. A decoder according to claim 7, wherein the decoder is an audio decoder, wherein the current signal portion of the signal being encoded by the plurality of current payload bits of the current bitstream payload is the current audio signal portion of an audio signal, and wherein the previous signal portion of the signal being encoded by the plurality of previous payload bits of the previous bitstream payload is a previous audio signal portion of the audio signal wherein the current bitstream payload encodes the plurality of spectral lines of the current audio signal portion.

9. A decoder according to claim 8, wherein, if the channel decoding module has indicated that the current bitstream payload comprises the one or more corrupted bits, and if the first part of the current bitstream payload does not comprise any of the one or more corrupted bits, the source decoding module is configured to select the full frame loss concealment mode as the selected error concealment mode, if the previous frame was concealed using full frame loss concealment.

10. A decoder according to claim 8, wherein, if the channel decoding module has indicated that the current bitstream payload comprises the one or more corrupted bits, and if the first part of the current bitstream payload does not comprise any of the one or more corrupted bits, the source decoding module is configured to select the full frame loss concealment mode as the selected error concealment mode, if a stability factor is smaller than a predefined threshold, wherein said stability factor indicates a stability of the current audio signal portion and of the previous audio signal portion.

11. A decoder according to claim 8, wherein, if the channel decoding module has indicated that the current bitstream payload comprises the one or more corrupted bits, and if the first part of the current bitstream payload does not comprise any of the one or more corrupted bits, the source decoding module is configured to select the full frame loss concealment mode as the selected error concealment mode, if the previous frame was concealed using full frame loss concealment; or if a stability factor is smaller than a predefined threshold, wherein said stability factor indicates a stability of the current audio signal portion and of the previous audio signal portion.

12. A decoder according to claim 10, wherein the predefined threshold is equal to 0.5.

13. A decoder according to claim 10, wherein, if the channel decoding module has indicated that the current bitstream payload comprises the one or more corrupted bits, and if the first part of the current bitstream payload does not comprise any of the one or more corrupted bits, the source decoding module is configured to select the full frame loss concealment mode as the selected error concealment mode, if the highest spectral line among the plurality of spectral lines of the current audio signal portion exhibits a frequency being smaller than or equal to a threshold frequency, and if the first part of the current bitstream payload encodes a signal component which is tonal or harmonic, and if the previous signal portion encodes at least one peak of the audio signal being greater than a peak threshold value and which corresponds to a frequency being greater than all frequencies being indicated by the plurality of spectral lines of the current audio signal portion.

14. A decoder according to claim 13, wherein a pitch of the audio signal exhibits a pitch frequency, and wherein, if the channel decoding module has indicated that the current bitstream payload comprises the one or more corrupted bits, and if the first part of the current bitstream payload does not comprise any of the one or more corrupted bits, the source decoding module is configured to select the full frame loss concealment mode as the selected error concealment mode, if the highest spectral line among the plurality of spectral lines of the current audio signal portion exhibits said frequency being smaller than or equal to said threshold frequency, and if the first part of the current bitstream payload encodes a signal component which is tonal or harmonic, and if all frequencies being indicated by the plurality of spectral lines of the current audio signal portion are smaller than the pitch frequency; or wherein, if the channel decoding module has indicated that the current bitstream payload comprises the one or more corrupted bits, and if the first part of the current bitstream payload does not comprise any of the one or more corrupted bits, the source decoding module is configured to select the full frame loss concealment mode as the selected error concealment mode,
if the highest spectral line among the plurality of spectral lines of the current audio signal portion exhibits said frequency being smaller than or equal to said threshold frequency, and
if the first part of the current bitstream payload encodes a signal component which is tonal or harmonic, and
if all frequencies being indicated by the plurality of spectral lines of the current audio signal portion are smaller than a maximal supported pitch frequency.

15. A decoder according to claim 14,
wherein, if the channel decoding module has indicated that the current bitstream payload comprises the one or more corrupted bits, and if the first part of the current bitstream payload does not comprise any of the one or more corrupted bits, the source decoding module is configured to select the full frame loss concealment mode as the selected error concealment mode, if the highest spectral line among the plurality of spectral lines of the current audio signal portion exhibits said frequency being smaller than or equal to said threshold frequency, and if the first part of the current bitstream payload does not encode a signal component of the audio signal which is tonal or harmonic, and if the ratio between the energy from 0 to the frequency bin $k_{be}-1$ of the previous quantized spectrum of the previous audio signal to the energy from 0 to the top of the previous quantized spectrum of the previous audio signal is smaller than a ratio threshold, wherein $k_{be}$ is a first spectral bin which cannot be recovered.

16. A decoder according to claim 15, wherein the ratio threshold is 0.3.

17. A decoder according to claim 15,
wherein, if the channel decoding module has indicated that the current bitstream payload comprises the one or more corrupted bits, and if the first part of the current bitstream payload does not comprise any of the one or more corrupted bits, the source decoding module is configured to select the partial frame loss concealment mode as the selected error concealment mode,
if the previous frame was not concealed using full frame loss concealment, and
if the highest spectral line among the plurality of spectral lines of the current audio signal portion exhibits a frequency being greater than said threshold frequency.

18. A decoder according to claim 17,
wherein, if the channel decoding module has indicated that the current bitstream payload comprises the one or more corrupted bits, and if the first part of the current bitstream payload does not comprise any of the one or more corrupted bits, the source decoding module is configured to select the partial frame loss concealment mode as the selected error concealment mode,
if the previous frame was not concealed using full frame loss concealment, and
if the highest spectral line among the plurality of spectral lines of the current audio signal portion exhibits said frequency being greater than said threshold frequency, and
if said stability factor is greater than or equal to said predefined threshold, and
if the first part of the current bitstream payload does not encode a signal component of the audio signal which is tonal or harmonic, and if the ratio between the energy from 0 to the frequency bin $k_{be}-1$ of the previous quantized spectrum of the previous audio signal to the energy from 0 to the top of the previous quantized spectrum of the previous audio signal is greater than or equal to said ratio threshold.

19. A decoder according to claim 17,
wherein, if the channel decoding module has indicated that the current bitstream payload comprises the one or more corrupted bits, and if the first part of the current bitstream payload does not comprise any of the one or more corrupted bits, the source decoding module is configured to select the partial frame loss concealment mode as the selected error concealment mode,
if the previous frame was not concealed using full frame loss concealment, and
if the highest spectral line among the plurality of spectral lines of the current audio signal portion exhibits said frequency being greater than said threshold frequency, and
if said stability factor is greater than or equal to said predefined threshold, and
if the first part of the current bitstream payload encodes a signal component which is tonal or harmonic, and if said highest spectral line among the plurality of spectral lines of the current audio signal portion exhibits a frequency being greater than the pitch frequency, and if the previous signal portion does not encode any peak of the audio signal being greater than said peak threshold value and which corresponds to said frequency being greater than all frequencies being indicated by the plurality of spectral lines of the current audio signal portion.

20. A decoder according to claim 8,
wherein, if the selected error concealment mode is the partial frame loss concealment mode, the source decoding module is configured to determine for each code word of a plurality of code words of the second part of the bitstream payload, depending on a number of corrected symbols of said code word, whether or not to conduct error concealment for those of the plurality of spectral lines of the current audio signal portion being represented by said code word, and to conduct error concealment for said those of the plurality of spectral lines of the current audio signal portion, for which the source decoding module has determined that error concealment shall be conducted.

21. A decoder according to claim 20,
wherein, for each code word of a plurality of code words of the second part of the bitstream payload, the source decoding module is configured to determine a risk value indicating an approximation of a probability that said code word is corrupt, and to determine whether or not said risk value is greater than a risk threshold.

22. A decoder according to claim 20,
wherein, if said risk value is greater than said risk threshold, the source decoding module is configured to conduct error concealment for those of the plurality of spectral lines of the current audio signal portion being represented by said code word.

23. A decoder according to claim 22, wherein the risk threshold is $2^{-16}$.

24. A decoder according to claim 20,
wherein the source decoding module is configured to conduct said error concealment for said code word in the partial frame loss error concealment mode.

25. A decoder according to claim 1,
wherein the channel decoding module is configured to detect that the bitstream payload comprises one or more corrupted bits,
if the channel decoding module encounters an uncorrectable code word within the bitstream payload and/or
if the channel decoding module, after conducting error correction on a plurality of code words of the bitstream payload, determines a re-calculated hash value, which depends on said plurality of code words after the error correction, that differs from a received hash value.

26. A system for decoding a frame to reconstruct a signal portion of a signal, wherein the system comprises:
an encoder for encoding a signal portion of a signal within a frame, and
a decoder for decoding the frame to reconstruct the signal portion of the signal,
wherein the decoder is configured for decoding the frame to reconstruct the signal portion of the signal, wherein the signal portion is encoded within the frame, wherein the frame comprises a bitstream payload and two or more redundancy bits, wherein the bitstream payload comprises a plurality of payload bits, wherein each of the payload bits exhibits a position within the bitstream payload, wherein the decoder comprises:
a channel decoding module, being configured to detect, depending on the two or more redundancy bits, whether the bitstream payload comprises one or more corrupted bits being one or more of the payload bits that are distorted or that are likely to be distorted,
a source decoding module,
wherein, if the channel decoding module has not detected any corrupted bits within the bitstream payload, the source decoding module is configured to decode the bitstream payload without conducting error concealment to reconstruct the signal portion,
wherein, if the channel decoding module has detected the one or more corrupted bits within the bitstream payload, the source decoding module is configured to select a selected error concealment mode of two or more error concealment modes depending on the position of at least one of the one or more corrupted bits within the bitstream payload and depending on a signal characteristic of the signal portion of the signal, and is configured to conduct error concealment depending on the selected error concealment mode to reconstruct the signal portion;
wherein the bitstream payload is partitioned into a first part of the plurality of payload bits of the bitstream payload, and into a second part of the plurality of payload bits of the bitstream payload;
wherein the bitstream payload is a current bitstream payload;
wherein, if the first part of the current bitstream payload does not comprise any of the one or more corrupted bits, the source decoding module is configured to select a full frame loss concealment mode of the two or more error concealment modes as the selected error concealment mode, if a highest spectral line among a plurality of spectral lines of a current audio signal portion exhibits a frequency being smaller than or equal to a threshold frequency.

27. A system according to claim 25, wherein the encoder comprises:
a source encoding module for encoding a signal portion of a signal within a frame, wherein the source encoding module is configured to generate the frame so that the frame comprises a bitstream payload and two or more redundancy bits, wherein the bitstream payload comprises a plurality of payload bits, wherein each of the payload bits exhibits a position within the bitstream payload, wherein the frame being generated by the source encoding module is suitable for being processed by the decoder, and
a channel encoding module being configured to generate the two or more redundancy bits depending on the bitstream payload.

28. A method for decoding a frame to reconstruct a signal portion of a signal, wherein the signal portion is encoded within the frame, wherein the frame comprises a bitstream payload and two or more redundancy bits, wherein the bitstream payload comprises a plurality of payload bits, wherein each of the payload bits exhibits a position within the bitstream payload, wherein the method comprises:
detecting, depending on the two or more redundancy bits, whether the bitstream payload comprises one or more corrupted bits being one or more of the payload bits that are distorted or that are likely to be distorted,
if no corrupted bits have been detected within the bitstream payload, decoding the bitstream payload without conducting error concealment to reconstruct the signal portion, and
if one or more corrupted bits have been detected within the bitstream payload, selecting a selected error concealment mode of two or more error concealment modes depending on the position of at least one of the one or more corrupted bits within the bitstream payload and depending on a signal characteristic of the signal portion of the signal, and conducting error concealment depending on the selected error concealment mode to reconstruct the signal portion;
wherein the bitstream payload is partitioned into a first part of the plurality of payload bits of the bitstream payload, and into a second part of the plurality of payload bits of the bitstream payload;
wherein the bitstream payload is a current bitstream payload;
wherein, if the first part of the current bitstream payload does not comprise any of the one or more corrupted bits, the method comprises selecting a full frame loss concealment mode of the two or more error concealment modes as the selected error concealment mode, if a highest spectral line among a plurality of spectral lines of a current audio signal portion exhibits a frequency being smaller than or equal to a threshold frequency.

29. A method, comprising:
encoding a signal portion of a signal within a frame, wherein the frame is generated so that the frame comprises a bitstream payload and two or more redundancy bits, wherein the bitstream payload comprises a plurality of payload bits, wherein each of the payload bits exhibits a position within the bitstream payload, and
conducting the method for decoding of claim 27 using the frame to decode the frame to reconstruct the signal portion of the signal.

30. A method for encoding a signal portion of a signal within a frame, wherein the method comprises:
generating the frame so that the frame comprises a bitstream payload and two or more redundancy bits, wherein the bitstream payload comprises a plurality of payload bits, wherein each of the payload bits exhibits a position within the bitstream payload, wherein the frame is suitable for being decoded by the method of claim 27.

31. A non-transitory computer-readable medium comprising a computer program for implementing a method according to claim 27 when being executed on a computer or signal processor.

32. A non-transitory computer-readable medium comprising a computer program for implementing a method according to claim 28 when being executed on a computer or signal processor.

33. A non-transitory computer-readable medium comprising a computer program for implementing a method according to claim 29 when being executed on a computer or signal processor.

34. A method for storing a frame, comprising storing the frame on a computer readable storage medium, the frame being generated according to the method of claim 29.

\* \* \* \* \*